June 18, 1968  E. J. DOWGIALLO, JR  3,389,018

FUEL CELL WITH REJUVENATION CONTROL DEVICE

Filed Oct. 22, 1965

*INVENTOR.*
EDWARD J. DOWGIALLO, JR.

BY Harry M. Serazowitz
Edward J. Kelly, Herbert Berl
& John W. Poteet, Jr.

ATTORNEYS

United States Patent Office 3,389,018
Patented June 18, 1968

3,389,018
FUEL CELL WITH REJUVENATION
CONTROL DEVICE
Edward J. Dowgiallo, Jr., 5623 Helmont Drive,
Oxon Hill, Md. 20021
Filed Oct. 22, 1965, Ser. No. 502,751
11 Claims. (Cl. 136—86)

The invention described herein may be manufactured and used by or for the Government for governmental purposes without the payment of any royalty thereon.

This invention relates in general to electrochemical reaction energy sources of the fuel cell variety and in particular to means for regulating the rejuvenation of such energy sources.

The direct conversion of chemical energy into electrical energy is accomplished in this type of energy source by chemical reactions which take place amongst reactive materials at the junctures between spaced electron conductors (which may be of such reactive material) in the presence of an ion transfer medium. In this type of system electrons are supplied by the reactive material termed the fuel and are effectively consumed by the other reactive material termed the anti-fuel, which are selected to yield electrons and to accept electrons respectively.

It will be appreciated that in accordance with the basic laws of conservation of energy, the fuel is depleted of electrons as the reaction progresses and that this deficiency must be compensated either by the revitalization of the fuel or the replacement thereof in whole or in part if the process is to continue. In some fuel cell operations the fuel, which may be liquid, gas, or otherwise, is replaced at periodic intervals irrespective of the condition of the fuel. This procedure, affords no consideration of energy source operating conditions, of course, and may be highly wasteful in many instances.

Generally, fuel cell operations are continuously monitored by various means and the fuel is revitalized or replaced as indicated during the course of operation. In the prior art, fuel cells have been monitored by voltage sensing means responsive to a minimum output voltage, float valve systems dependent upon the equilibrium condition between water being formed by the fuel cell and water being released by the exhaust, pressure sensing means, temperature sensing means etc.

The monitoring systems of the prior art have presented operational problems of varying degree which have precluded optimum utilization in selected applications. For example, the voltage sensing means necessitates a reference voltage level source and a logic circuit which, dependent largely upon the accuracy requirement of the system, may add significantly to the cost, weight and size of the assembly. Similarly, both the float valve system and the pressure sensing system are inherently cumbersome due to a water processing and storage requirement. The temperature sensing system is not necessarily bulky but it has been found to be relatively insensitive to slight variations which may have a significant effect on fuel cell operations in some instances.

It will be appreciated that a means for rejuvenation of fuel cells which directly and precisely relates the initiation of the rejuvenation process to the actual electron deficiency condition of the system without unduly increasing the cost, weight, or size of the system is needed and would be welcomed as a substantial advancement of the art. Accordingly:

It is an object of this invention to provide a rejuvenation control means for energy sources of the fuel cell variety which is responsive to the actual electron deficiency condition of the fuel utilized by the energy source.

It is another object of this invention to provide a rejuvenation control means for energy souces of the fuel cell variety which permits shutdown of the energy source for extended periods of time.

It is also an object of this invention to provide a rejuvenation control means for energy sources of the fuel cell variety having a minimum size.

It is a further object of this invention to provide a rejuvenation control means for energy sources of the fuel cell variety which does not require extensive calibration.

It is still another object of this invention to provide a rejuvenation control means for energy sources of the fuel cell variety which is relatively inexpensive to produce.

It is still a further object of this invention to provide a rejuvenation control means for energy sources of the fuel cell variety which is adaptable to a wide variety of fuel cell devices.

Other objects of the invention will become apparent upon a more comprehensive understanding of the invention for which reference is had to the following specification and drawings wherein.

Figure 1:
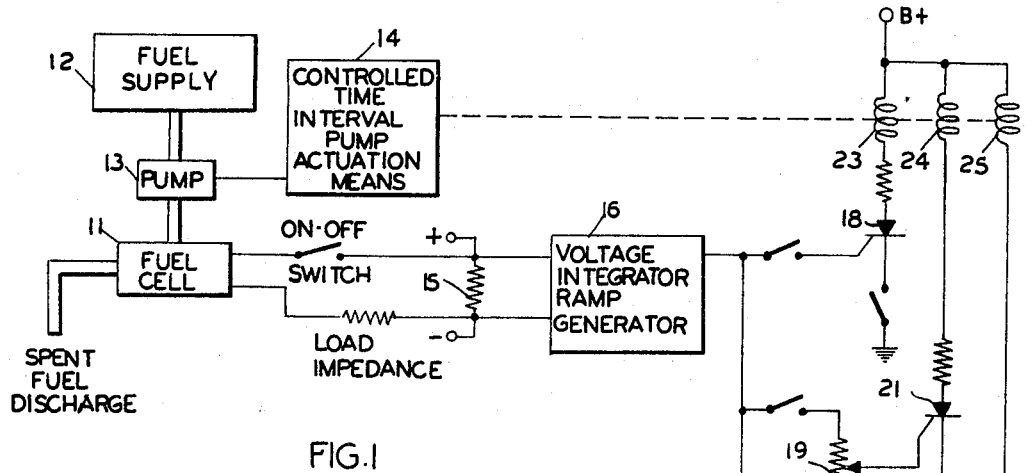
FIGURE 1 is a schematic block diagram of one embodiment of the device of this invention.

Briefly, the device of this invention is an electronic control means which is responsive to the accrued current drain from the energy source system and is adapted to initiate rejuvenation when an integrated voltage representative of the accrued current drain reaches a selected level.

Referring now to the drawings in more detail:

FIGURE 1 depicts a fuel cell 11, a fuel storage system 12 and a pump means 13, having a control means 14, and adapted to supply fuel to the fuel cell as the dissipation condition thereof indicates. It will be appreciated of course, that the illustrated pump means 13 and illustrated control means 14 therefor are not essential to the system and that the fuel may be supplied to the fuel cell by gravity feed or otherwise in selected applications, provided of course, some means for controlling the influx of replacement fuel, or additive for example, a solenoid operated valve, is incorporated.

In accordance with this invention, current flow measurement is obtained by means of a shunt resistance 15 connected across the output of the fuel cell 11. An integrator means 16, which may incorporate a voltage ramp generator as indicated, is connected across the resistance 15 to provide a voltage output with a time base slope proportional to total current flow in the fuel system. The output of the ramp generator is connected directly to the control electrode of a silicon controlled rectifier 18 and via voltage divider means 19 and 20 to silicon controlled rectifiers 21 and 22 respectively, such that the series connected relay means 23, 24 and 25 each associated with a respective silicon controlled rectifier will activate the pump means 13 for a selected time interval. It will be appreciated that the time interval of operation of the pump 14 will vary with each application and that the selected period will be determined by the size of the fuel cell, the type of fuel, the rate of influx, etc.

It will be appreciated that by adjustment of the tap on the voltage divider means 19 and 20, silicon controlled rectifiers 18, 21, and 22 may be adapted to fire at selected points on the voltage ramp, as desired, and that simple relay means, not shown, may be incorporated in the pump actuation means 14, for example, to effectively disconnect each silicon controlled rectifier subsequent to the initiation of the pump actuation means by the firing thereof.

Thus the embodiment of FIGURE 1 enables any number of rejuvenations of the fuel cell provided, of course, that number of silicon controlled rectifiers and associated voltage dividers are incorporated in the system.

While the embodiment of FIGURE 1 is useful in many fuel cell applications, it is recognized that the number of rejuvenations possible is limited by the electronic circuitry and that in the event the system is shut down for an extended period the ramp generator output (which may be in capacitor stored) may deteroriate at an undetermined rate, which may, of course, adversely effect operation of the system. The embodiment of FIGURE 2 provides all the advantages of the embodiment of FIGURE 1 and is not only intermittently operable with extended periods of inactivity but it may be readily adapted to automatically revert to its initial state upon completion of each rejuvenation cycle and to continue in operation indefinitely.

Figure 2:
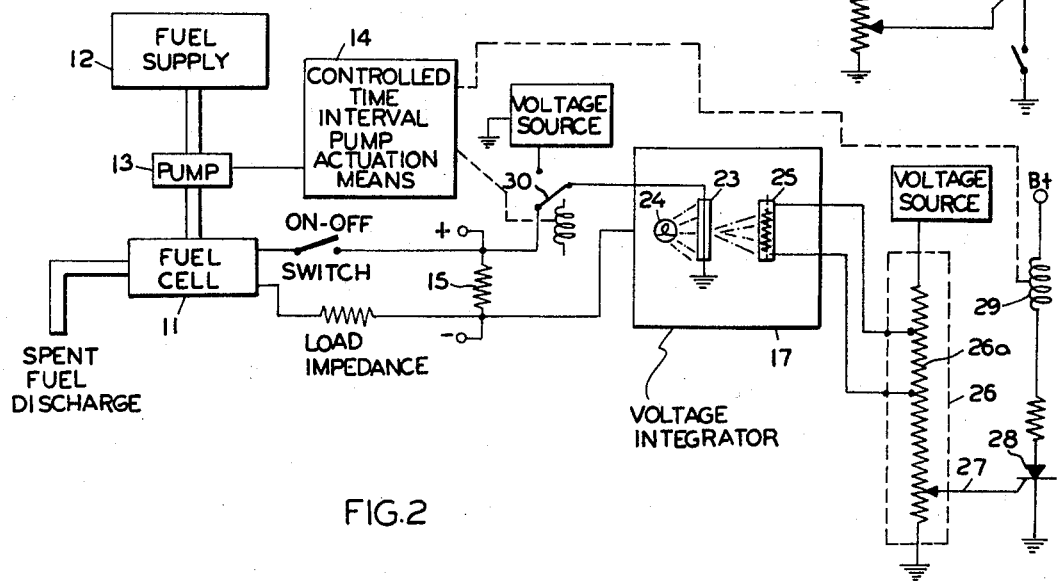
FIGURE 2 is a schematic block diagram of a second embodiment of the device of this invention.

In FIGURE 2, the fuel cell 11, fuel storage system 12 pump means 13, and controlled time interval pump actuations means 14 are assembled in conventional fashion. In this embodiment, however the output representative of the current of the fuel cell 11, taken across shunt resistance 15, is applied to a voltage integrator 16A incorporating a microcoulometer device 23 which affords an electrochemical deposition of metal proportional to the quantity of current passing through the resistance 15. In accordance with the basic concept of this invention, the metal deposition is so disposed to form a variable shutter means which determines the amount of light from light source 24 which is incident on photosensitive surface 25.

The photoresistive surface 25 is connected in shunt with resistive section 26A of voltage divider 26. The voltage at tap 27 on voltage divider 26 is applied to the control terminal of a high current solid state switching means such as a silicon controlled rectifier 28. Thus, when the voltage at tap 27 reaches a selected magnitude, the silicon controlled rectifier 28 is fired and serially connected relay means 29 is actuated and this, in turn, via controlled time internal actuation means 14, initiates the fuel cell rejuvenation operation.

It has been found that the microcoulometer device 23, which may constitute a capillary bore with two columns of mercury separated by a small aqueous electrolyte gap in a completely liquid filled sealed system is especially adaptable to continuous duty use, in that the deposition of mercury is reversible by simply changing the direction of current flow therethrough. It will be appreciated that such a reversal is readily accomplished by switching means 30 which is adapted to respond upon initiation of the rejuvenation operation by electro-mechanical relay means 31 or otherwise, as desired.

Further, it has been found that the rejuvenation control means is especially adaptable to intermittent fuel cell operation application because the controlling deposition of metal in the microcoulometer does not dissipate during intervals of inactivity as in the prior art charged capacitor case, for example, and may be resumed at any instant, as desired. In addition it has been found that by incorporation of sealed microcoulometer means and relay means temperature humidity and other environmental consideration can be virtually ignored in the device of this invention.

It is understood, of course, that the device of this invention may be utilized for rejuvenation of any fuel or antifuel and that it is within the purview of this invention to alter the structure thereof in accordance with standard procedure in the art to accommodate any unique applications not specifically set forth herein.

Finally, it is understood that this invention is to be limited only by the scope of the appended claims.

What is claimed is:

1. In a fuel cell system including a fuel cell of replenishable fuel variety, a fuel supply reservoir; input means for controlled introduction of the contents of said reservoir into said fuel cell; controlled time interval actuation means adapted to control said input means; voltage integrator means responsive to the output of said fuel cell and adapted to produce an output proportional to ampere hours dissipation of said fuel cell; normally open, voltage responsive switching means including relay means responsive to the operational state thereof; means connecting said voltage integrator means to said switching means and adapted to change the operational state thereof; and means connecting said relay means to said actuation means such that said actuation means is actuated upon a change in operational state of said switching means from its normal operational state.

2. An assembly as defined in claim 1 wherein said voltage integrator includes a ramp generator means adapted to provide an output having a magnitude proportional to ampere hours.

3. In a system as defined in claim 2 wherein said switching means is in a high current capacity device of the silicon controlled rectifier variety.

4. An assembly as defined in claim 1 wherein said voltage integrator includes a microcoulometer means adapted to electrochemically change the dimension of an electrolyte gap proportional to ampere hours dissipation of said fuel cell; a photosensitive surface and a light source adapted to illuminate said surface through said electrolyte gap, said switching means being responsive to a selected degree of change in photo response of said sensitive surface.

5. An assembly as defined in claim 4 wherein a voltage representative of the magnitude and polarity of the output of said fuel cell is applied across said electrolyte gap of said microcoulometer means.

6. An assembly as defined in claim 5 wherein said photosensitive surface is a photovoltaic surface.

7. An assembly as defined in claim 6 wherein said switching means is a high current capacity device of the silicon controlled rectifier variety.

8. An assembly as defined in claim 1 wherein means are provided for restoring said voltage integrator means to its initial state subsequent to activation of said controlled time interval actuation means.

9. An assembly as defined in claim 5 wherein means are provided for restoring said electrolyte gap of said microcoulometer to its initial dimension subsequent to actuation of said controlled time interval actuation means.

10. An assembly as defined in claim 9 wherein said means for restoring said electrolyte gap includes means for applying a voltage of opposite polarity with respect to the polarity of said voltage representative of the output of said fuel cell across said electrolytic gap subsequent to actuation of said controlled time interval actuation means.

11. Each and every novel feature and combination of novel features present in or possessed by the mechanism (or process or product) herein disclosed.

References Cited

UNITED STATES PATENTS

| 3,268,364 | 8/1966 | Code et al. | 136—86 |
| 3,343,991 | 9/1967 | Koenig | 136—86 |

ALLEN B. CURTIS, *Primary Examiner.*

Disclaimer 3,389,018.—*Edward J. Dowgiallo, Jr.*, Oxon Hill, Md. FUEL CELL WITH REJUVENATION CONTROL DEVICE. Patent dated June 18, 1968. Disclaimer filed Oct. 7, 1968, by the inventor.

Hereby enters this disclaimer to claim 11 of said patent.

[*Official Gazette April 29, 1969.*]